United States Patent [19]
Choi

[11] Patent Number: 5,907,533
[45] Date of Patent: May 25, 1999

[54] DISC CLAMPING DEVICE FOR ALTERNATIVELY LOADING A MINI DISC AND A COMPACT DISC ON A SINGLE TURNTABLE

[75] Inventor: Young Suk Choi, Seoul, Rep. of Korea

[73] Assignee: Daewoo Electronics Co., Ltd., Seoul, Rep. of Korea

[21] Appl. No.: 08/778,366

[22] Filed: Jan. 2, 1997

Related U.S. Application Data

[63] Continuation-in-part of application No. 08/328,827, Oct. 25, 1994, abandoned.

[30] Foreign Application Priority Data

Oct. 27, 1993 [KR] Rep. of Korea ............... 93-22452

[51] Int. Cl.⁶ ............................ G11B 23/33; G11B 23/00
[52] U.S. Cl. .................................... 369/271; 369/264
[58] Field of Search .................. 369/270, 271, 369/264; 360/99.05, 99.12

[56] References Cited

U.S. PATENT DOCUMENTS

| | | | |
|---|---|---|---|
| 4,841,517 | 6/1989 | Kurihara et al. | 369/270 |
| 4,847,826 | 7/1989 | Sakaguchi | 369/270 |
| 4,853,924 | 8/1989 | Takahashi et al. | 369/270 |

FOREIGN PATENT DOCUMENTS

| | | | |
|---|---|---|---|
| 58-100283 | 6/1983 | Japan | 369/270 |
| 60-113356 | 6/1985 | Japan | 369/270 |
| 2223053 | 9/1990 | Japan | 369/270 |
| 2260272 | 10/1990 | Japan | 369/270 |

*Primary Examiner*—David D. Davis
*Attorney, Agent, or Firm*—Beveridge, DeGrandi, Weilacher & Young, LLP

[57] ABSTRACT

A mini disc or a compact disc can be alternatively loaded on a single turntable of a disc player. A compact disc is loaded, a first hub is inserted into a central hole of the compact disc so as for the compact disc to be placed on a first loading face, and then, a clamper head which has a cover, a retainer, and a clamper wheel assembled with each other clamps the compact disc. Meanwhile, when a mini disc is loaded, a mini disc cartridge is loaded directly on a turntable. In this case, the mini disc cartridge is firmly secured on the turntable owing to a magnetic interaction between the metal disc cartridge and a first magnet provided in the turntable.

15 Claims, 6 Drawing Sheets

DISC CLAMPING DEVICE FOR ALTERNATIVELY LOADING A MINI DISC AND A COMPACT DISC ON A SINGLE TURNTABLE

This application is a continuation-in-part of application Ser. No. 08/328,827, filed Oct. 25, 1994, which application is entirely incorporated herein by reference and now abandoned.

BACKGROUND OF THE INVENTION

1. Field of the Invention

The present invention relates to a disc clamping device. More particularly, the present invention relates to a disc clamping device by which a mini disc (MD) and a compact disc (CD) can be selectively loaded on a single turntable of a disc player.

2. Description of the Prior Art

A disc player can be classified into a mini disc player, a compact disc player, and a laser disc player in accordance with the kinds of the discs, such as a mini disc, a compact disc and a laser disc, which are loaded on the disc player. Recently, there have been briskly developed compatible disc players which can load any of the variously sized discs in an alternative manner.

Particularly, the development is concentrated on a disc clamping device by which two kinds of discs can be alternatively loaded, and by which particularly a compact disc and a laser disc can be alternatively loaded on a single turn table.

U.S. Pat. No. 4,841,517 (issued to Kurihara et al.) discloses a clamping device by which a compact disc and a laser disc can be alternatively loaded on a single turntable of a disc player. In the device, as shown in FIG. 6A, a first hub 14 is inserted into a center hole of a compact disc 12, and then, compact disc 12 is clamped on a turntable 10 by means of a second hub 16. In the meantime, as shown in FIG. 6B, second hub 16 is inserted into a center hole of a laser disc 18, and then, laser disc 18 is clamped on turntable 10 by means of a clamper 19.

Meanwhile, U.S. Pat. No. 4,853,924 (issued to Takahashi et al.) discloses another disc clamping device by which a compact disc and a laser disc can be alternatively loaded on a single turn table of a disc player. In the device, as shown in FIG. 7A, when a compact disc 22 is loaded, a first conical portion 25a (having a small diameter) of a hub 25 is inserted into a center hole of compact disc 22, and a magnet 27 of a clamper head 29 presses down compact disc 22 by exerting magnetic forces. As shown in FIG. 7B, when a laser disc 23 is loaded, a second conical portion 25b (having a large diameter) of hub 25 is inserted into a center hole of laser disc 23, and the bottom of clamper head 29 directly presses down laser disc 23.

The above described devices can be applied only to a disc player in which a compact disc and a laser disc can be alternatively loaded. However, the devices can not be applied to a disc player in which a mini disc can also be loaded. The reason is that generally a mini disc cannot be loaded in a bare form, but can be loaded with the mini disc installed within a mini disc cartridge, and the above described devices cannot clamp the mini disc cartridge.

Therefore, there has arisen a need for a clamping device which is capable of clamping a mini disc and another disc, such as a compact disc and a laser disc, larger than the mini disc, alternatively. However, no prior art for such a device has been found.

SUMMARY OF THE INVENTION

Accordingly, it is an object of the present invention to provide a disc clamping device by which a mini disc and another disc larger than the mini disc can be loaded on a single turntable in an alternative manner, and in which a positional departure of the disc can be prevented, thereby assuring a secure loading.

To achieve the above object, the present invention provides a disc clamping device of a disk player comprising:

a turntable including a first loading face for loading a second disc larger than a mini disc, a second loading face for loading a mini disc, and a first magnet for securing the mini disc on the second loading face by an attractive magnetic force, the first loading face and the second loading face having a different height from each other;

a chuck arm having a chuck hole and installed above the turntable of the disc player;

a clamper head for clamping the compact disc mounted on the first loading face of the turntable only when the compact disc is loaded, the clamper head having a cylindrical clamping wheel including an upwardly open first annular recess, and a downwardly open second annular recess, and inserted into the chuck hole of the chuck arm in such a manner as to move up and down therein but not escape therefrom;

a apring installed within the second recess;

a cover snapped on the clamper wheel in such a manner as to cover the second magnet and the first recess; and a retainer for guiding the clamper head to be centered on the turntable, the retainer being inserted through the clamper wheel from below, with one end of the retainer being engaged with an upper portion of the clamper wheel, and the retainer being supported by the spring so that a downward biasing force is applied thereto.

According to one embodiment of the present invention, the turntable comprises:

a base plate;

a first hub having a diameter same as that of the center hole of the second disc, the first hub having an annular rubber attached on the upper surface thereof; and a second hub having a diameter same as that of the center hole of the mini disc, the first loading face being an upper face of the base plate, the second loading face being an upper face of the rubber, and the first magnet being an annular magnet inserted in an annular magnet groove formed on the first loading face.

According to another embodiment of the present invention, the clamper wheel comprises:

a cylindrical outer wall having two opposite wings protruding in radially outward direction and an annular projection respectively formed on the upper and lower ends of the outer surface thereof, four snap locks formed on the upper end of the inner surface thereof and spaced out regular circumferential intervals apart, and four reference protuberances spaced out regular circumferential intervals apart between the snap locks;

a cylindrical intermediate wall;

a cylindrical inner wall;

a lower wall connecting the lower ends of the outer wall and the intermediate wall;

an upper wall connecting the upper ends of the inner wall and the intermediate wall and having four first engagement holes spaced out regular circumferential intervals apart.

According to another embodiment of the present invention, the first recess is defined by the outer wall, the intermediate wall and the lower wall.

According to another embodiment of the present inveniton, the second recess is defined by the inner wall, the intermediate wall and the upper wall.

According to another embodiment of the present invention, the cover comprises:

an upper plate having center hole formed at the center thereof, four second engagement holes disposed around the center hole and spaced out regular circumferential intervals apart, and four notches spaced out regular circumferential intervals apart between the four second engagement holes at the outer periphery of the upper plate; and a first cylindrical wall extending downward from the inner circumference of the center hole.

According to another embodiment of the present invention, the retainer comprises:

a second cylindrical wall having a lower threshold extending inward from its lower end, and having an inner threshold extending upward from the inner end of the lower threshold, a lower end of the inner threshold being chamfered and the spring being disposed in a space formed by the second recess, the lower threshold and the inner threshold; and a plurality of hooks disposed on the outer circumferential face of the second cylindrical wall and spaced out regular circumferential intervals apart;

the hooks passing through the engagement holes to be engaged with the upper face of the intermediate wall, and the spring contacting with the lower face of the upper wall and with the lower threshold of the retainer, whereby the retainer is assembled with the clamper wheel.

According to the clamping device of the present invention, when a compact disc is loaded, a first hub is inserted into a central hole of the compact disc so as for the compact disc to be placed on a first loading face, and then, a clamper head which has a cover, a retainer, and a clamper wheel assembled with each other clamps the compact disc. Meanwhile, when a mini disc is loaded, a mini disc cartridge is loaded directly on a turntable. Under this condition, the mini disc cartridge is firmly secured on the turntable owing to a magnetic interaction between the metal disc cartridge and a first magnet provided in the turntable.

BRIEF DESCRIPTION OF THE DRAWINGS

The above object, and other features and advantages of the present invention will become more apparent by describing in detail the preferred embodiment of the present invention with reference to the attached drawings, in which.

DESCRIPTION OF THE PREFERRED EMBODIMENT

In the following descriptions, a clamping device capable of loading a mini disc and a compact disc alternatively will be taken as an embodiment of the present invention.

Figure 1:
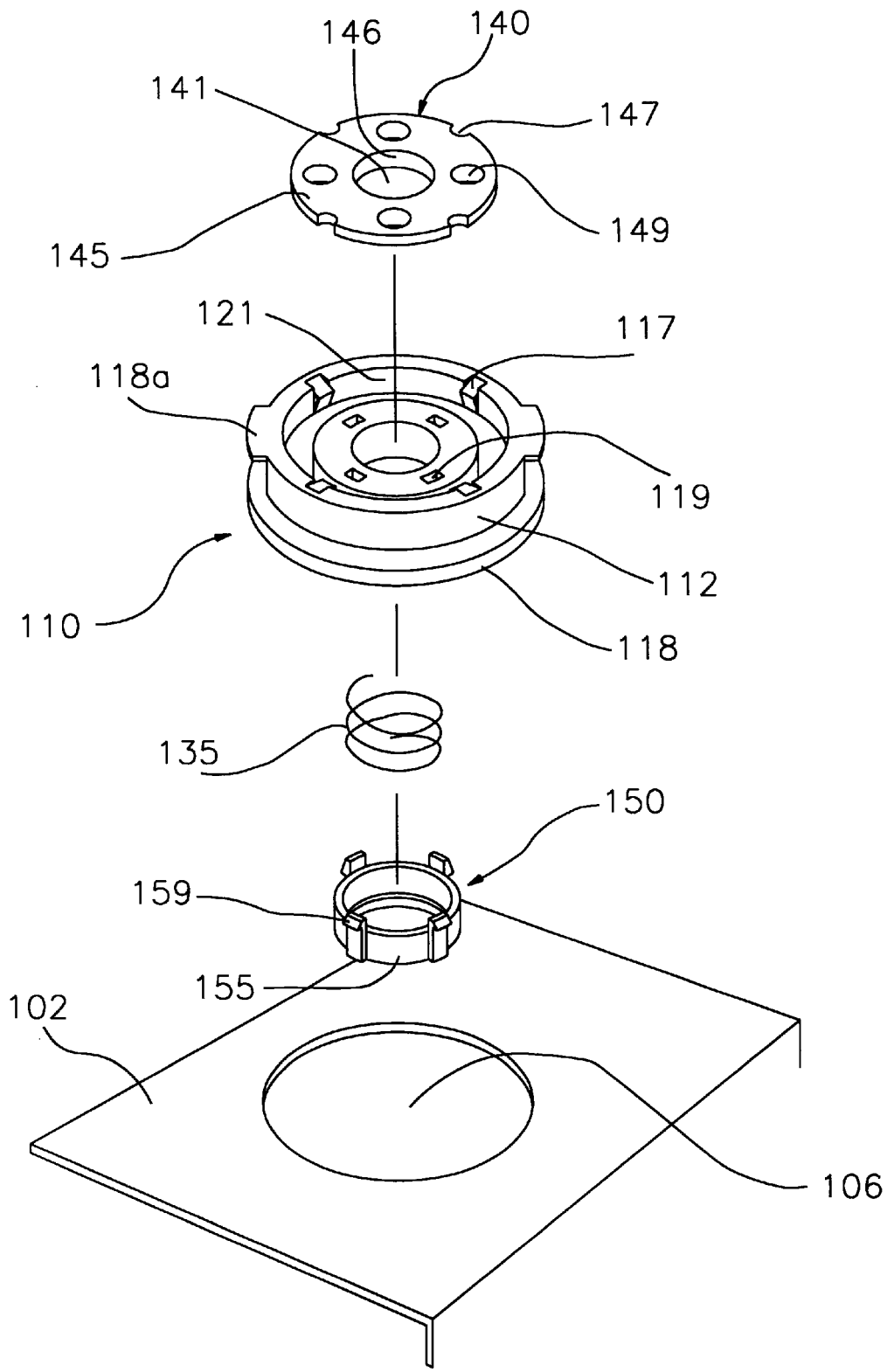
FIG. 1 is an exploded perspective view of the clamper head of the disc clamping device according to an embodiment of the present invention.
Figure 2:
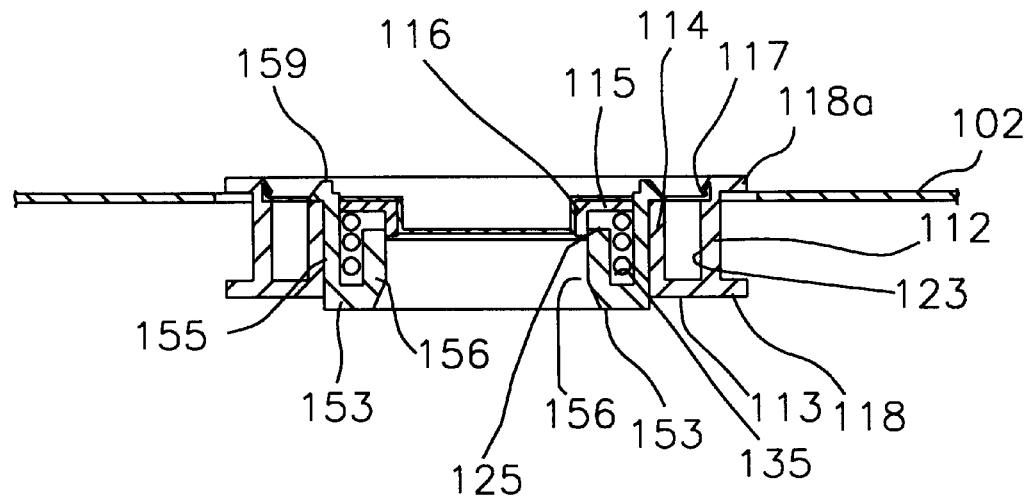
FIG. 2 is a side sectional view of the clamper head of FIG. 1.

FIGS. 1 and 2 are respectively an exploded perspective view and an assmbled sectional view of the clamper head of the clamping device according to one embodiment of the present invention. Referring to these two drawings, the clamper head has a cylindrical clamper wheel 110 which is inserted into a chuck hole 106 of a chuck arm 102 installed on a turntable of the disc player. Clamper wheel 110 includes an outer wall 112, an intermediate wall 114 and an inner wall 116 which are of cylindrical form. A lower wall 113 connects the lower portions of outer wall 112 and intermediate wall 114, while an upper wall 115 connects the upper portions of inner wall 116 and intermediate wall 114. Therefore an upwardly open first annular recess 123 is defined by outer wall 112, intermediate wall 114 and lower wall 113, while a downwardly open second annular recess 125 is defined by inner wall 116, intermediate wall 114 and upper wall 115. A spring 135 is installed in second recess 125. Four first engagement holes 119 are formed on upper wall 115 spaced out regular circumferential intervals apart. Two opposite wings 118a protruding in radially outward direction are formed on the upper end and annular projection 118 is formed on the lower end of the outer face of outer wall 112. On the inner upper end of outer wall 112, there are formed four snap locks 117 spaced out regular circumferential intervals apart. Between the respective snap locks 117, there are formed four reference protuberances 121 spaced out regular circumferential intervals apart.

Meanwhile, a cover 140, which covers over clamper wheel 110, is provided with an upper plate 145 having a center hole 141 at the center thereof, and a first cylindrical wall 146 extending downward from the inner circumference of center hole 141. Upper plate 145 is provided with four second engagement holes 149 spaced out regular circumferential intervals apart. Between the respective four second engagement holes 149, there are formed four notches 147 spaced out regular circumferential intervals apart.

A retainer 150, which is assembled with clamper wheel 110 from below, includes a second cylindrical wall 155, and four hooks 159 spaced out regular circumferential intervals apart. Cylindrical wall 155 is provided with a lower threshold 153 extending inward at the lower end thereof, and an inner threshold 156 extending upward from the inner end of lower threshold 153. A lower end of the inner threshold is chamfered and the spring 135 is disposed in a space formed by second recess 125, lower threshold 153 and inner threshold 156.

The components of the clamper head constituted as above are assembled in the following manner. First, clamper wheel 110 is inserted with inclination from below into chuck hole 106 of chuck arm 102 which is installed above the turntable, so that clamper wheel 110 is movable upward and downward, but cannot depart from chuck hole 106 owing to two wings 118a and annular projection 118. Then, four notches 147 of cover 140 are aligned with four reference protuberances 121, and then, cover 140 is pressed down onto the upper portion of first recess 123, so that cover 140 is closely secured to clamper wheel 110 by snap locks 117, and that first engagement hole 119 and second engagement hole 149 is aligned in a straight line. Then, spring 135 is inserted into second annular recess 125, and then, retainer 150 is inserted also into second annular recess 125, in such a manner that each of four hooks 159 should pass through each pair of first and second engagement holes 119 and 149 to be engaged with the upper face of intermediate wall 114, and that spring 135 should contact with the lower face of upper wall 115 and with lower threshold 153 of retainer 150. Thus the assembling of the clamper head is completed as shown in FIG. 2.

Figure 3:
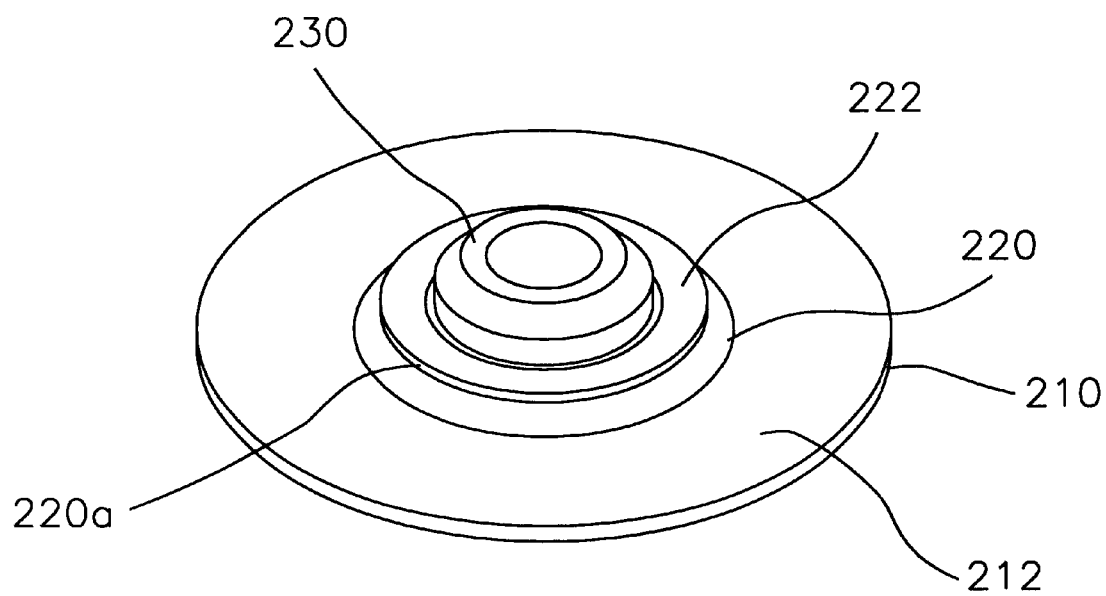
FIG. 3 is a schematic perspective view of a turntable of the disc clamping device according to the embodiment of FIG. 1.

Meanwhile, referring to FIG. 3 showing a perspective view of a turntable on which a compact disc can be clamped by the clamper head of FIGS. 1 and 2 or a mini disk can be clamped, the turntable includes; a base plate 210; a first hub 220 disposed on the middle of base plate 210; and having a diameter same as that of the center hole of a compact disc 310; and a second hub 230 disposed on the middle of first hub 220; and having a diameter same that of the center hole of a mini disc 320. An annular rubber 220a is provided on the upper face of first hub 220. The upper face of base plate 210 serves as a first loading face 212 for loading a compact disc 310, while the upper face of a rubber 220a serves as a second loading face 222 for loading a mini disc 320. A cylindrical magnet groove 224 is formed on the upper surface of second hub 230 and a first magnet 226 is inserted into magnet groove 224. Then, the first magnet uses a cylindrical type which has more attractive force than a spring force of spring 135.

Figure 4:
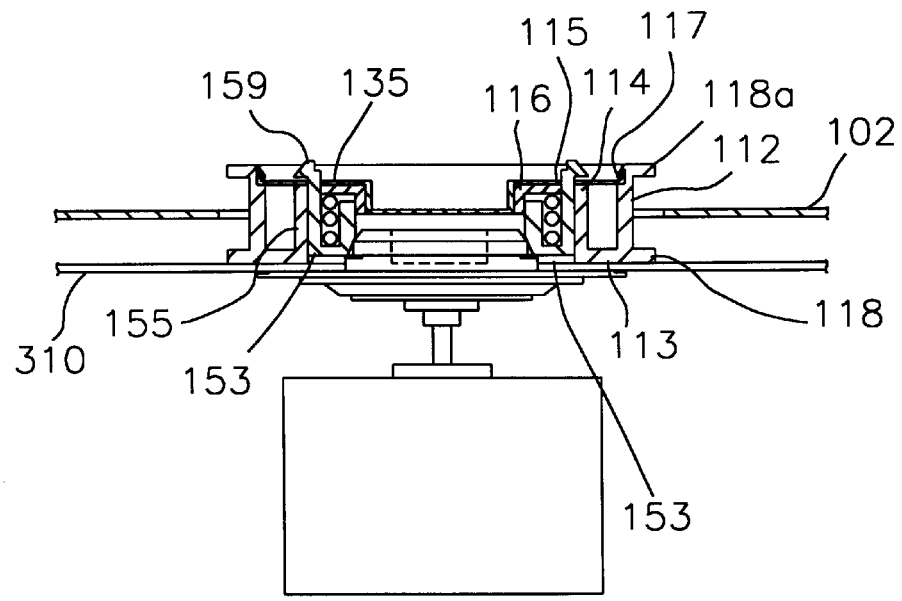
FIGS. 4 and 5 are side sectional views of the clamping device of FIGS. 1 to 3 respectively in which a compact disc and a mini disc are loaded on the turntable.
Figure 5:
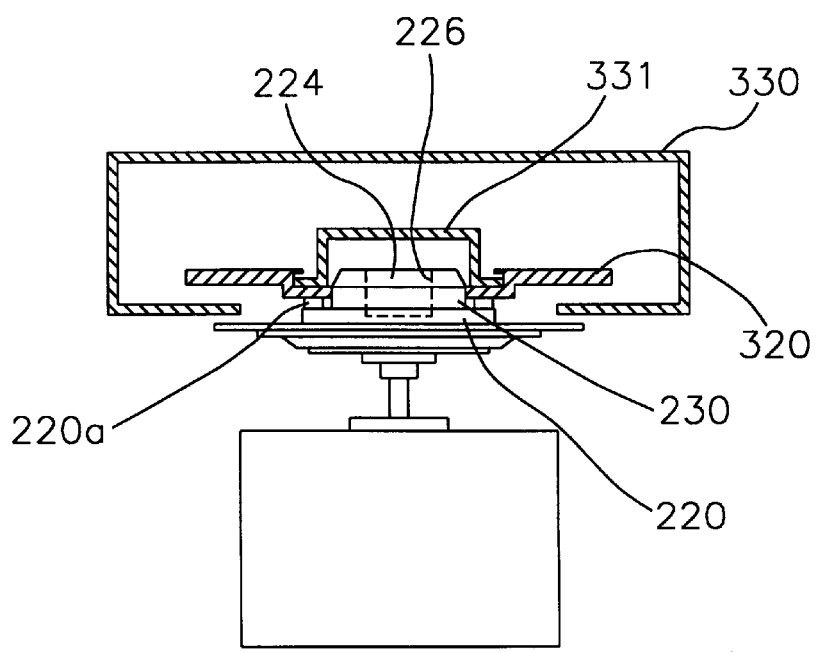
Figure 6A:
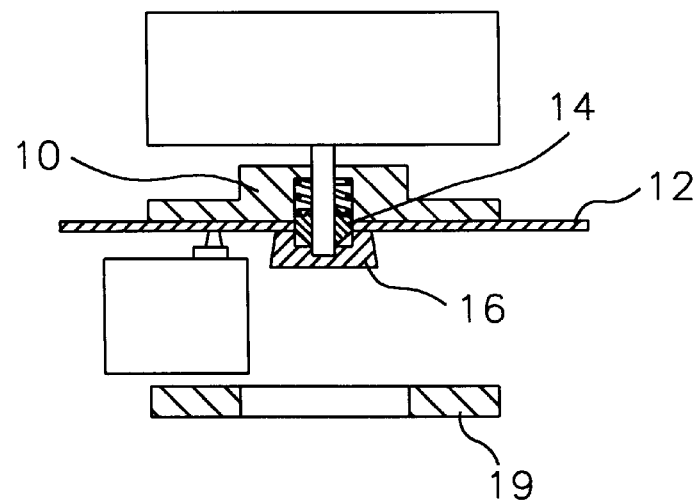
FIGS. 6A and 6B are schematic perspective views of a conventional disc clamping device respectively in which a compact disc and a laser disc are loaded on a single turntable.
Figure 6B:
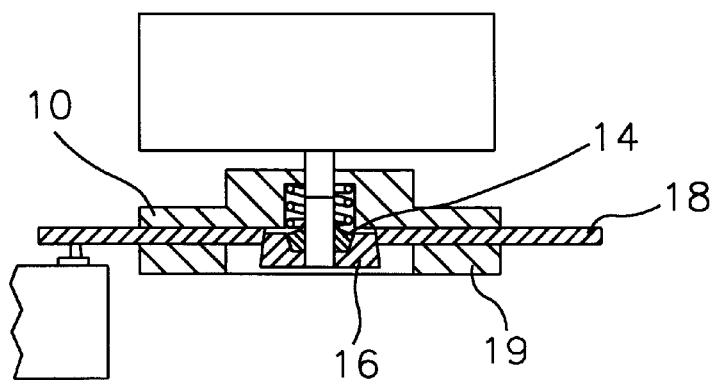
Figure 7A:
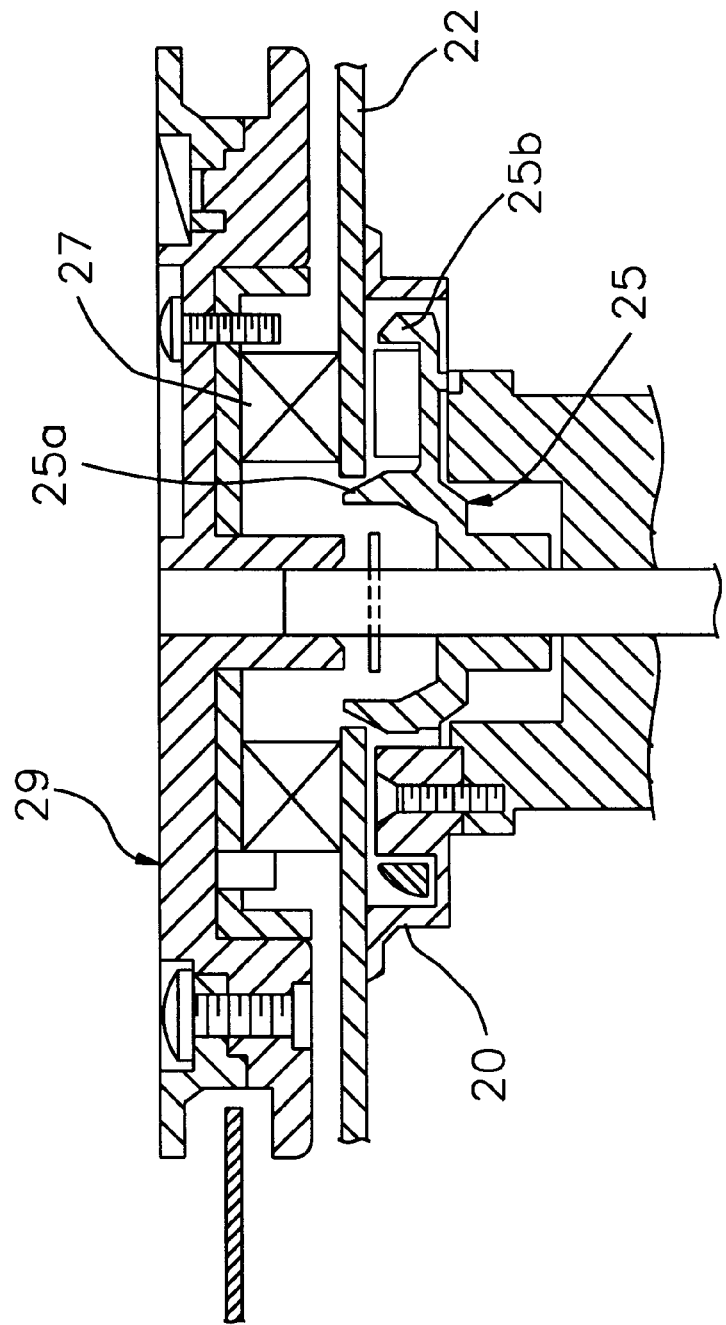
FIGS. 7A and 7B are schematic perspective views of another conventional disc clamping device respectively in which a compact disc and a laser disc are loaded on a single turntable.
Figure 7B:
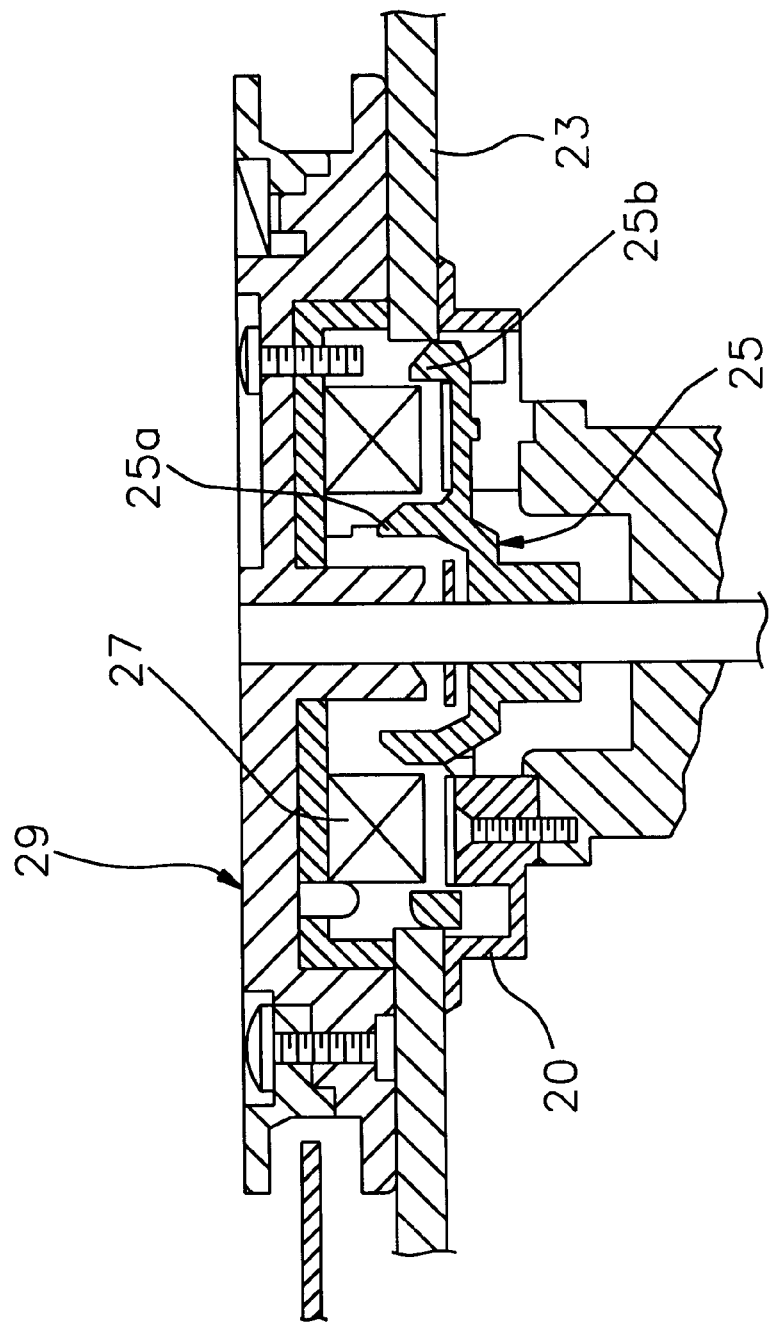

FIGS. 4 and 5 are side sectional views showing the clamping device of FIGS. 1 through 3, in which compact disc 310 and mini disc 320 are loaded on the turntable, respectively. When compact disc 310 is loaded as shown in FIG. 4, comapct disc 310 is mounted on first loading face 212, in such a manner that first hub 220 should be inserted into the center hole of compact disc 310. Then the clamper head clamps compact disc 310. In this case, an attractive magentic force is applied between first magnet inserted into magnet groove 24 of turntable and cover 140 made of steel. Accordingly, the bottom of clamper wheel 110 is closely contacted with the upper face of compact disc 310, and retainer 150 is pushed upward, in such a manner that the bottom of retainer 150 should be in contact with rubber 220a higher than the bottom of clamper wheel 110, thereby compressing spring 135 upward. Therefore, the spring force pushing down retainer 150 acts also on the compact disc. When the retainer is pushed upward, the chamfered plane of the retainer is pressed by the turntable and forced downward against the force of spring 135 so that the clamper head is centered.

Meanwhile, when mini disc 320 is loaded, as shown in FIG. 5, because mini disc 320 is not separted from a mini disc cartridge 330, mini cartridge 330 enclosing mini disc 320 is loaded on the turntable. In this case, a steel center plate 331 disposed at the middle portion in mini disc cartridge 330 is closely contacted with the turntable owing to the magnetic interaction between steel center plate 331 and first magnet 226 provided in the turntable. Clamper wheel 110 is maintained in separation from the turntable.

By the clamping device according to the present invention as described above, a mini disc and other larger discs such as a compact disc or a laser disc can be loaded on a single turntable in an alternative manner. Further, such discs can be securely loaded on the turntable by means of the clamping device according to the present invention. The present invention has a further advantage that the manufacturing cost of the clamping device is relatively low.

The present invention was described in the above based on the preferred embodiment, and the present invention is not limited to the preferred embodiment, but various changes and modifications can be added without departing from the scope of the present invention.

What is claimed is:

1. A disc clamping device of a disk player for a compact disc and a mini disc comprising:
    a turntable including a first hub having a first loading face for loading the compact disc, a second hub having a second loading face for loading the mini disc, and a first magnet for securing the mini disc on said second loading face by an attractive magnetic force, said first hub and said second hub having different heights from each other;
    a chuck arm having a chuck hole and installed above said turntable of the disc player; and
    a clamper head for clamping the compact disc and the mini disc mounted on said first and second loading faces of turntable, said clamper head having
        a cylindrical clamping wheel which includes an upwardly open first annular recess and a downwarldy open second annular recess, and inserted into said chuck holw of said chuck arm in such a manner as to move up and down therein but not escape therefrom;
        a spring installed within said second annular recess;
        a cover positioned on said clamping wheel in such a manner as to cover said first annular recess; and
        a retinaer for guiding said clamping wheel to be centered on said turntable, said retainer being inserted into said second annular recess of said clamping wheel from below, with one end of said retainer being engaged with said second annular recess of said clamping wheel, said retainer including
            a cylindrical wall, said cylindrical wall having a lower threshold extending inward from a lower end of the cylindrical wall and an inner threshold extending upward from an inner end of said lower threshold, a lower end of said inner threshold being chamfered and said spring being disposed in a space formed by said second annular recess, said lower threshold and said inner threshold; and
            a plurality of hooks disposed on an outer circumferential face of said cylindrical wall and spaced out at regular circumferential intervals apart, wherein said spring is installed between said second annular recess and said retainer.

2. The disc clamping device of a disk player as claimed in claim 1, wherein the number of hooks is more than 2.

3. The disc clamping device of a disk player as claimed in claim 1, wherein said turntable comprises:
    a base plate;
    said first hub having a diameter same as that of the center hole of the compact disc, the first hub having an annular rubber attached on an upper surface thereof; and
    said second hub having a diameter same as that of the center hole of the mini disc, the second hub having a cylinderical magnet groove formed on an upper surface thereof,
    said first loading face being a first upper face of said base plate, and said second loading face being a second upper face of said rubber.

4. The disc clamping device of a disk player as claimed in claim 1, wherein said clamping wheel includes
    a cylindrical outer wall having two opposite wings protruding in radially outward direction and an annular projection respectively formed on an upper and lower ends of an outer surface thereof, four snap locks formed on an upper end of an inner surface thereof and spaced out at regular circumferential intervals apart, and four reference protuberances spaced out regular circumferential intervals apart between said snap locks;

a cylindrical intermediate wall;

a cylinderical inner wall;

a lower wall connecting lower ends of said outer wall and said intermediate wall;

an upper wall connecting upper ends of said inner wall and said intermediate wall and having four first engagement holes spaced out regular circumferential intervals apart.

5. The disc clamping device of a disk player as claimed in claim 4, wherein said first annular recess is defined by said outer wall, said intermediate wall and said lower wall, and said second annular recess is defined by said inner wall, said intermediate wall and said upper wall.

6. The disc clamping device of a disk player as claimed in claim 1, wherein said cover includes an upper plate having a center hole formed at a center thereof, four second engagement holes disposed around said center hole and spaced out regular circumferential intervals apart, and four notches spaced out regular circumferential intervals apart between said four second engagement holes at an outer periphery of said upper plate; and a first cylindrical wall extending downward from an inner circumferential of said center hole.

7. The disc clamping device of a disk player as claimed in claim 1, wherein said first hub, said second hub, and said turntable are integrally formed as one piece.

8. The disc clamping device of a disk player as claimed in claim 1, wherein said first hub is fixedly joined together with said turntable so as to be fixed in relative position to each other.

9. The disc clamping device of a disk player as claimed in claim 1, wherein said first hub extends upwardly from a top surface of said turntable.

10. The disc clamping device of a disk player as claimed in claim 9, wherein said second hub extends upwardly from a top surface of said first hub.

11. The disc clamping device of a disk player as claimed in claim 1, wherein the first loading face of said first hub has a different support level than the second loading face of said second hub both during an operational mode and a non-operational mode of the turntable.

12. A disc clamping device of a disk player for a compact disc and a mini disc comprising:

a turntable including a first loading face for loading the compact disc, a second loading face for loading the mini disc, and a first magnet for securing the mini disc on said second loading face by an attractive magnetic force, said first loading face and said second loading face having different heights from each other, said turntable further including a base plate;

a first hub having a diameter same as that of the center hole of the compact disc, the first hub having an annular rubber attached on an upper surface thereof; and a second hub having a diameter same as that of the center hole of the mini disc, the second hub having a cylindrical magnet groove formed on an upper surface thereof, said first loading face being a first upper face of said base plate, and said second loading face being a second upper face of said rubber;

a chuck arm having a chuck hole and installed above said turntable of the disc player; and a clamper head for clamping the compact disc and the mini disc mounted on said first and second loading faces of turntable, said clamper head having a cylindrical clamping wheel which includes an upwardly open first annular recess and a downwardly open second annular recess, and inserted into said chuck hole of said chuck arm in such a manner as to move up and down therein but not escape therefrom;

a apring installed within said second annular recess;

a cover positioned on said clamper wheel in such a manner as to cover said first annular recess, a retainer for guiding said clamping wheel to be centered on said turntable, said retainer being inserted through said clamping wheel from below, with one end of said retainer being engaged with an upper portion of said clamper wheel, said retainer including a cylindrical wall, said cylindrical wall having a lower threshold extending inward from a lower end of the cylindrical wall and an inner threshold extending upward from an inner end of said lower threshold, a lower end of said inner threshold being chamfered and said spring being disposed in a space formed by said second annular recess, said lower threshold and said inner threshold, and a plurality of hooks disposed on an outer circumferential face of said cylindrical wall and spaced out at regular circumferential intervals apart, said hooks being upwardly pressed against the force of said spring and said clamper head being centered along a chamfered plane of said retainer contact with said turntable.

13. A disc clamping device of a disk player for a compact disc and a mini disc comprising:

a turntable including a first loading face for loading the compact disc, a second loading face for loading the mini disc, and a first magnet for securing the mini disc on said second loading face by an attractive magnet force, said first loading face and said second loading face having different heights from each other;

a chuck arm having a chuck hole and installed above said turntable of the disc player; and a clamper head for clamping the compact disc and the mini disc mounted on said first and second loading faces of turntable, said clamper head having a cylindrical clamping wheel which includes an upwardly open first annular recess and a downwardly open second annular recess, and inserted into said chuck hole of said chuck arm in such a manner as to move up and down therein but not escape therefrom, said clamping wheel including a cylindrical outer wall having two opposite wings protruding in radially outward direction and an annular projection respectively formed on upper and lower ends of an outer surface thereof, four snap locks formed on an upper end of an inner surface thereof and spaced out at regular circumferential intervals apart, and four reference protuberances spaced out regular circumferential intervals apart between said snap locks;

a cylindrical intermediate wall;

a cylindrical inner wall;
a lower wall connecting lower ends of said outer wall and said intermediate wall;
an upper wall connecting upper ends of said inner wall and said intermediate wall and having four first engagement holes spaced out regular circumferential intervals apart;
a spring installed within said second annular recess;
a cover positioned on said clamper wheel in such a manner as to cover said first annular recess; and
a retainer for guiding said clamping wheel to be centered on said turntable, said retainer being inserted through said clamping wheel from below, with one end of said retainer being engaged with an upper portion of said clamper wheel, said retainer including
a cylindrical wall, said cylindrical wall having a lower threshold extending inward from its lower end of the cylindrical wall and an inner threshold extending upward from an inner end of said lower threshold, a lower end of said inner threshold being chamfered and said spring being disposed in a space formed by said second annular recess, said lower threshold and said inner threshold, and
a plurality of hooks disposed on an outer circumferential face of said cylindrical wall and spaced out at regular circumferential intervals apart, said hooks being upwardly pressed against the force of said spring and said clamper head being centered along a chamfered plane of said retainer contact with said turntable.

14. The disc clamping device of a disk player as claimed in claim 13, wherein said first annular recess is defined by said outer wall, said intermediate wall and said lower wall, and said second annular recess is defined by said inner wall, said intermediate wall and said upper wall.

15. A disc clamping device of a disk player for a compact disc and a mini disc comprising:
a turntable including a first loading face for loading the compact disc, a second loading face for loading the mini disc, and a first magnet for securing the mini disc on said second loading face by an attractive magnetic force, said first loading face and said second loading face having different heights from each other;
a chuck arm having a chuck hole and installed above said turntable of the disc player; and
a clamper head for clamping the compact disc and the mini disc mounted on said first and second loading faces of said turntable, said clamper head having
a cylindrical clamping wheel which includes an upwardly open first annular recess and a downwardly open second annular recess, and inserted into said chuck hole of said chuck arm in such a manner as to move up and down therein but not escape therefrom;
a spring installed within said second annular recess;
a cover positioned on said clamper wheel in such a manner as to cover said first annular recess, said cover includes
an upper plate having a center hole formed at a center thereof, four second engagement holes disposed around said center hole and spaced out regular circumferential intervals apart, and four notches spaced out regular circumferential intervals apart between said four second engagement holes at an outer periphery of said upper plate; and
a first cylindrical wall extending downward from an inner circumferential of said center hole; and
a retainer for guiding said clamping wheel to be centered on said turntable, said retainer being inserted through said clamping wheel from below, with one end of said retainer being engaged with an upper portion of said clamper wheel, said retainer including
a cylindrical wall, said cylindrical wall having a lower threshold extending inward from a lower end of a cylindrical wall and an inner threshold extending upward from an inner end of said lower threshold, a lower end of said inner threshold being chamfered and said spring being disposed in a space formed by said second annular recess, said lower threshold and said inner threshold, and
a plurality of hooks disposed on an outer circumferential face of said cylindrical wall and spaced out at regular circumferential intervals apart, said hooks being upwardly pressed against the force of said spring and said clamper head being centered along a chamfered plane of said retainer contacted with said turntable.

* * * * *